US012738203B2

(12) United States Patent
Lee et al.

(10) Patent No.: US 12,738,203 B2
(45) Date of Patent: Sep. 15, 2026

(54) PIXEL CIRCUIT, DISPLAY DEVICE INCLUDING THE PIXEL CIRCUIT, AND ELECTRONIC DEVICE INCLUDING THE DISPLAY DEVICE

(71) Applicant: Samsung Display Co., LTD., Yongin-si (KR)

(72) Inventors: Jiyoung Lee, Yongin-si (KR); Hyunyoung Choi, Yongin-si (KR); Sang-Gu Lee, Yongin-si (KR); Hyung Uk Cho, Yongin-si (KR); Jisong Chae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/075,542

(22) Filed: Mar. 10, 2025

(65) Prior Publication Data

US 2025/0391325 A1 Dec. 25, 2025

(30) Foreign Application Priority Data

Jun. 21, 2024 (KR) ........................ 10-2024-0080986

(51) Int. Cl.
*G09G 3/32* (2016.01)
*G09G 3/3233* (2016.01)

(52) U.S. Cl.
CPC ............ *G09G 3/32* (2013.01); *G09G 3/3233* (2013.01); *G09G 2300/043* (2013.01); *G09G 2300/0819* (2013.01); *G09G 2310/08* (2013.01)

(58) Field of Classification Search
None
See application file for complete search history.

(56) References Cited

U.S. PATENT DOCUMENTS

2015/0255523 A1* 9/2015 Her ...................... G09G 3/3233 345/76
2016/0124491 A1* 5/2016 An ........................ G06F 1/3265 713/323

(Continued)

FOREIGN PATENT DOCUMENTS

KR 10-1058114 B1 8/2011
KR 10-1127582 B1 3/2012

(Continued)

*Primary Examiner* — Dorothy Harris
(74) *Attorney, Agent, or Firm* — Womble Bond Dickinson (US) LLP

(57) ABSTRACT

A pixel circuit includes a first transistor including a control electrode connected to a first node, a first electrode connected to a second node, and a second electrode connected to a third node, a second transistor for receiving a data write gate signal, a first electrode connected to a data line, and a second electrode connected to the third node, a third transistor for receiving an initialization gate signal of a first next stage, and connected between the second and first nodes, a first capacitor connected between the third first nodes, a seventh transistor including for receiving an initialization gate signal of a second next stage, and connected between the first node and a fourth node, a second capacitor connected to the fourth node, and a light-emitting element configured to receive a voltage of the third node, and connected to a line of a low power supply voltage.

20 Claims, 13 Drawing Sheets

(56) References Cited

U.S. PATENT DOCUMENTS

| | | | | |
|---|---|---|---|---|
| 2016/0155383 A1* | 6/2016 | Chen | .................... | G09G 3/3258 345/78 |
| 2016/0189635 A1* | 6/2016 | Lee | ...................... | G09G 3/3291 345/77 |
| 2017/0047010 A1* | 2/2017 | Chen | .................... | G09G 3/3233 |
| 2024/0096284 A1* | 3/2024 | Kim | ..................... | G09G 3/3233 |

FOREIGN PATENT DOCUMENTS

| | | |
|---|---|---|
| KR | 10-2020-0062742 A | 6/2020 |
| KR | 10-2023-0023482 A | 2/2023 |

* cited by examiner

PIXEL CIRCUIT, DISPLAY DEVICE INCLUDING THE PIXEL CIRCUIT, AND ELECTRONIC DEVICE INCLUDING THE DISPLAY DEVICE

CROSS-REFERENCE TO RELATED APPLICATION

The present application claims priority to, and the benefit of, Korean Patent Application No. 10-2024-0080986, filed on Jun. 21, 2024, in the Korean Intellectual Property Office, the entire disclosure of which is incorporated herein by reference.

BACKGROUND

1. Field

Embodiments of the present disclosure relates to a pixel circuit, a display device including the pixel circuit, and an electronic device including the display device.

2. Description of the Related Art

In general, a display device includes a display panel and a display panel driver. The display panel includes gate lines, data lines, emission lines, and pixel circuits. The display panel driver includes a gate driver for providing a gate signal to the gate lines, a data driver for providing a data voltage to the data lines, an emission driver for providing an emission signal to the emission lines, and a driving controller for controlling the gate driver, the data driver, and the emission driver.

Recently, a display device having a small area and high PPI (Pixels Per Inch) is desired. In this case, because a pitch occupied by the pixel circuit is narrowed, there may be restrictions on a number of transistors constituting the pixel circuit and a signal applied to the pixel circuit.

SUMMARY

Embodiments of the present disclosure provide a pixel circuit for a small area and high PPI.

Embodiments of the present disclosure provide a display device including the pixel circuit.

Embodiments of the present disclosure provide an electronic device including the display device.

In one or more embodiments of a pixel circuit according to the present disclosure, a pixel circuit includes a first transistor including a control electrode connected to a first node, a first electrode connected to a second node, and a second electrode connected to a third node, a second transistor including a control electrode for receiving a data write gate signal, a first electrode connected to a data line for providing a data voltage, and a second electrode connected to the third node, a third transistor including a control electrode for receiving an initialization gate signal of a first next stage, a first electrode connected to the second node, and a second electrode connected to the first node, a first capacitor including a first electrode connected to the third node, and a second electrode connected to the first node, a seventh transistor including a control electrode for receiving an initialization gate signal of a second next stage, a first electrode connected to the first node, and a second electrode connected to a fourth node, a second capacitor including a first electrode connected to the fourth node, and a second electrode, and a light-emitting element including an anode electrode configured to receive a voltage of the third node, and a cathode electrode connected to a line of a low power supply voltage.

The pixel circuit may further include a fourth transistor including a control electrode for receiving an initialization gate signal, a first electrode connected to the third node, and a second electrode.

The second electrode of the second capacitor and the second electrode of the fourth transistor may be connected to a line of an initialization voltage.

The second electrode of the second capacitor and the second electrode of the fourth transistor may be connected to the line of the low power supply voltage.

The second electrode of the second capacitor may be connected to the line of the low power supply voltage, wherein the second electrode of the fourth transistor is connected to a line of an initialization voltage.

The second electrode of the second capacitor may be connected to a line of a high power supply voltage, wherein the second electrode of the fourth transistor is connected to a line of an initialization voltage.

The pixel circuit may further include a fifth transistor configured to selectively connect a line of a high power supply voltage and the second node in response to a first emission signal, and a sixth transistor configured to selectively connect the third node and the anode electrode in response to a second emission signal.

The first to seventh transistors may include N-type transistors.

In a first duration, the initialization gate signal and the second emission signal have a high level, the data write gate signal, the initialization gate signal of the first next stage, the initialization gate signal of the second next stage, and the first emission signal have a low level, the fourth transistor is turned on in response to the initialization gate signal having the high level to provide an initialization voltage to the third node, and the sixth transistor is turned on in response to the second emission signal having the high level to provide a voltage of the third node to the anode electrode.

In a second duration following the first duration, the initialization gate signal, the initialization gate signal of the first next stage, and the first emission signal have the high level, the initialization gate signal of the second next stage changes from the low level to the high level, the data write gate signal, and the second emission signal have the low level, the fourth transistor is turned on in response to the initialization gate signal having the high level to provide the initialization voltage to the third node, the sixth transistor is turned off in response to the second emission signal having the low level, the fifth transistor is turned on in response to the first emission signal having the high level to provide the high power supply voltage to the second node, the third transistor is turned on in response to the initialization gate signal of the first next stage having the high level to provide a voltage of the second node to the first node, the seventh transistor is turned on in response to the initialization gate signal of the second next stage having the high level to provide a voltage of the first node to the fourth node, the first transistor is turned on in response to the voltage of the first node and the voltage of the third node to connect the second node and the third node, and the fourth transistor is turned on in response to the initialization gate signal having the high level to connect the third node and the line of the initialization voltage.

In a third duration following the second duration, the initialization gate signal, the initialization gate signal of the first next stage, and the initialization gate signal of the second next stage have the high level, the data write gate signal, the first emission signal, and the second emission signal have the low level, and the fifth transistor is turned off in response to the first emission signal having the low level.

In a fourth duration following the third duration, the initialization gate signal of the first next stage and the initialization gate signal of the second next stage have the high level, the data write gate signal, the initialization gate signal, the first emission signal, and the second emission signal have the low level, and the fourth transistor is turned off in response to the initialization gate signal having the low level.

In a fifth duration following the fourth duration, the data write gate signal and the initialization gate signal of the second next stage have the high level, the initialization gate signal, the initialization gate signal of the first next stage, the first emission signal, and the second emission signal have the low level, the third transistor is turned off in response to the initialization gate signal of the first next stage having the low level, and the second transistor is turned on in response to the data write gate signal having the high level to provide the data voltage to the third node.

In a sixth duration following the fifth duration, the data write gate signal, the initialization gate signal, the initialization gate signal of the first next stage, and the initialization gate signal of the second next stage have the low level, the first emission signal and the second emission signal change from the low level to the high level, the seventh transistor is turned off in response to the initialization gate signal of the second next stage having the low level, the second transistor is turned off in response to the data write gate signal having the low level, the fifth transistor is turned on in response to the first emission signal having the high level, and the sixth transistor is turned on in response to the second emission signal having the high level.

In one or more embodiments of a display device according to the present disclosure, a display device includes a display panel including a pixel circuit, and a display panel driver configured to drive the display panel, wherein the pixel circuit includes a first transistor including a control electrode connected to a first node, a first electrode connected to a second node, and a second electrode connected to a third node, a second transistor including a control electrode for receiving a data write gate signal, a first electrode connected to a data line for providing a data voltage, and a second electrode connected to the third node, a third transistor including a control electrode for receiving an initialization gate signal of a first next stage, a first electrode connected to the second node, and a second electrode connected to the first node, a first capacitor including a first electrode connected to the third node, and a second electrode connected to the first node, a seventh transistor including a control electrode for receiving an initialization gate signal of a second next stage, a first electrode connected to the first node, and a second electrode connected to a fourth node, a second capacitor including a first electrode connected to the fourth node, and a second electrode, and a light-emitting element including an anode electrode configured to receive a voltage of the third node, and a cathode electrode connected to a line of a low power supply voltage.

The pixel circuit may further include a fourth transistor including a control electrode for receiving an initialization gate signal, a first electrode connected to the third node, and a second electrode.

The second electrode of the second capacitor and the second electrode of the fourth transistor may be connected to a line of an initialization voltage.

The second electrode of the second capacitor and the second electrode of the fourth transistor may be connected to the line of the low power supply voltage.

The second electrode of the second capacitor may be connected to the line of the low power supply voltage, wherein the second electrode of the fourth transistor is connected to a line of an initialization voltage.

In one or more embodiments of an electronic device according to the present disclosure, an electronic device includes a display panel including a pixel circuit, and a display panel driver configured to drive the display panel, and a processor configured to control the display panel driver, wherein the pixel circuit includes a first transistor including a control electrode connected to a first node, a first electrode connected to a second node, and a second electrode connected to a third node, a second transistor including a control electrode for receiving a data write gate signal, a first electrode connected to a data line for providing a data voltage, and a second electrode connected to the third node, a third transistor including a control electrode for receiving an initialization gate signal of a first next stage, a first electrode connected to the second node, and a second electrode connected to the first node, a first capacitor including a first electrode connected to the third node, and a second electrode connected to the first node, a seventh transistor including a control electrode for receiving an initialization gate signal of a second next stage, a first electrode connected to the first node, and a second electrode connected to a fourth node, a second capacitor including a first electrode connected to the fourth node, and a second electrode, and a light-emitting element including an anode electrode configured to receive a voltage of the third node, and a cathode electrode connected to a line of a low power supply voltage.

According to the pixel circuit, the display device including the pixel circuit, and the electronic device including the pixel circuit, the first capacitor may store a threshold voltage of the first transistor. Therefore, the threshold voltage of the first transistor may be compensated.

The second capacitor may be connected to the first capacitor, and the data voltage applied to the first transistor may be distributed by the first capacitor and the second capacitor. Therefore, a data range of the data voltage may be expanded.

Even if the light-emitting element emits a light and a voltage of the anode electrode fluctuates, the first capacitor may maintain a gate-source voltage of the first transistor. Therefore, a change of the gate-source voltage of the first transistor may be reduced or prevented, and thus a change of the driving current may be reduced or prevented.

Because the third, fourth, and seventh transistors use a same gate signal (e.g., the initialization gate signal), a number of gate signals applied to the pixel circuit may be reduced. Therefore, a dead space may be reduced.

BRIEF DESCRIPTION OF THE DRAWINGS

The above and other features of embodiments of the present disclosure will become more apparent by describing in detailed embodiments thereof with reference to the accompanying drawings, in which.

DETAILED DESCRIPTION

Figure 1:
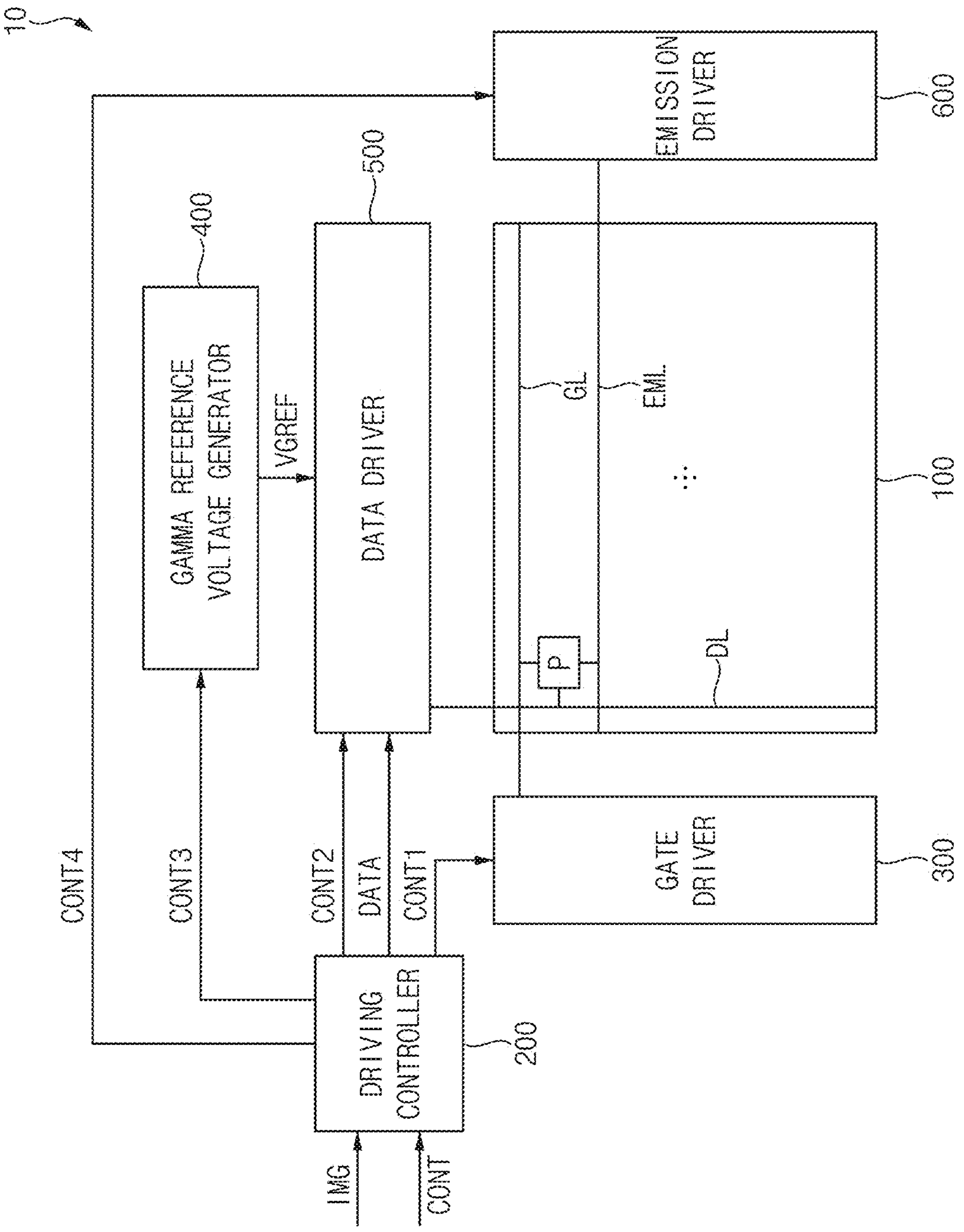
FIG. 1 is a block diagram showing a display device according to embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms “first,” “second,” etc. may represent “first-category (or first-set),” “second-category (or second-set),” etc., respectively.

The terminology used herein is for the purpose of describing embodiments only and is not intended to be limiting of the present disclosure. As used herein, the singular forms “a” and “an” are intended to include the plural forms as well, while the plural forms are also intended to include the singular forms, unless the context clearly indicates otherwise. It will be further understood that the terms “comprises,” “comprising,” “have,” “having,” “includes,” and “including,” when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms “substantially,” “about,” “approximately,” and similar terms are used as terms of approximation and not as terms of degree, and are intended to account for the inherent deviations in measured or calculated values that would be recognized by those of ordinary skill in the art. For example, “substantially” may include a range of +/−5% of a corresponding value. “About” or “approximately,” as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within ±30%, 20%, 10%, 5% of the stated value. Further, the use of “may” when describing embodiments of the present disclosure refers to “one or more embodiments of the present disclosure.” Furthermore, the expression “being the same” may mean “being substantially the same”. In other words, the expression “being the same” may include a range that can be tolerated by those of ordinary skill in the art. The other expressions may also be expressions from which “substantially” has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram showing a display device according to embodiments of the present disclosure.

Referring to FIG. 1, a display device 10 may include a display panel 100 and a display panel driver. The display panel driver may include a driving controller 200, a gate driver 300, a gamma reference voltage generator 400, a data driver 500, and an emission driver 600.

For example, the driving controller 200 and the data driver 500 may be formed integrally. For example, the driving controller 200, the gamma reference voltage generator 400, and the data driver 500 may be formed integrally. For example, the driving controller 200, the gate driver 300, the gamma reference voltage generator 400, and the data driver 500 may be formed integrally. For example, the driving controller 200, the gate driver 300, the gamma reference voltage generator 400, the data driver 500, and the emission driver 600 may be formed integrally. For example, a driving module in which at least the driving controller 200 and the data driver 500 are formed integrally may be named a timing controller embedded data driver (TED).

The display panel 100 may include a display area for displaying an image and a peripheral area arranged adjacent to the display area.

For example, the display panel 100 may be an organic light-emitting diode display panel including an organic light-emitting diode. For another example, the display panel 100 may be a quantum-dot organic light-emitting diode display panel including an organic light-emitting diode and a quantum-dot color filter. For another example, the display panel 100 may be a quantum-dot nano light-emitting diode display panel including a nano light-emitting diode and a quantum-dot color filter. For another example, the display panel 100 may be a liquid crystal display panel including a liquid crystal layer.

The display panel 100 may include gate lines GL, data lines DL, emission lines EML, and pixel circuits P electrically connected to the gate lines GL, the data lines DL, and the emission lines EML, respectively. The gate lines GL may extend in a first direction, the data lines DL may extend in a second direction crossing the first direction, and the emission lines EML may extend in the first direction.

The driving controller 200 may receive input image data IMG and an input control signal CONT from an external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The driving controller 200 may generate the fourth control signal CONT4 for controlling an operation of the emission driver 600 based on the input control signal CONT, and may output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In one or more embodiments, the gate driver 300 may be integrated on the peripheral area of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be arranged in the driving controller 200 or may be arranged in the data driver 500.

The data driver 500 may receive the second control signal CONT2 and the data signal DATA from the driving controller 200, and may receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In one or more embodiments, the emission driver 600 may be integrated in the peripheral area of the display panel 100. In one or more embodiments, the emission driver 600 may be mounted in the peripheral area of the display panel 100.

In FIG. 1, for a convenience of an explanation, the gate driver 300 may be arranged on a first side of the display panel 100 and the emission driver 600 may be arranged on a second side of the display panel 100, although the present disclosure is not limited thereto. For example, both the gate driver 300 and the emission driver 600 may be arranged on the first side of the display panel 100. For example, both the gate driver 300 and the emission driver 600 may be arranged on respective sides of the display panel 100. For example, the gate driver 300 and the emission driver 600 may be formed integrally.

The display device 10 according to one or more embodiments is a device for displaying a video or still image, and may be used as a display screen for various products, such as television, laptops, monitors, billboards, Internet of Things (IoTs), as well as portable electronic devices, such as mobile phone, smart phone, tablet personal computer (PC), mobile communication terminal, electronic notebook, electronic book, portable multimedia player PMP, navigation system, and ultra mobile PC UMPC. In addition, the display device 10 according to one or more embodiments may be used in wearable devices, such as smart watches, watch phones, glasses-type displays, head-mounted displays HMDs, virtual reality (VR) devices, or augmented reality (AR) devices. In addition, the display device 10 according to one or more embodiments may be used as a dashboard of a vehicle, a center information display (CID) located in a center fascia or a dashboard of the vehicle, a room mirror display replacing a side mirror of the vehicle, an entertainment element for a rear seat of the vehicle, and a display located on a rear surface of the front seat.

Figure 2:
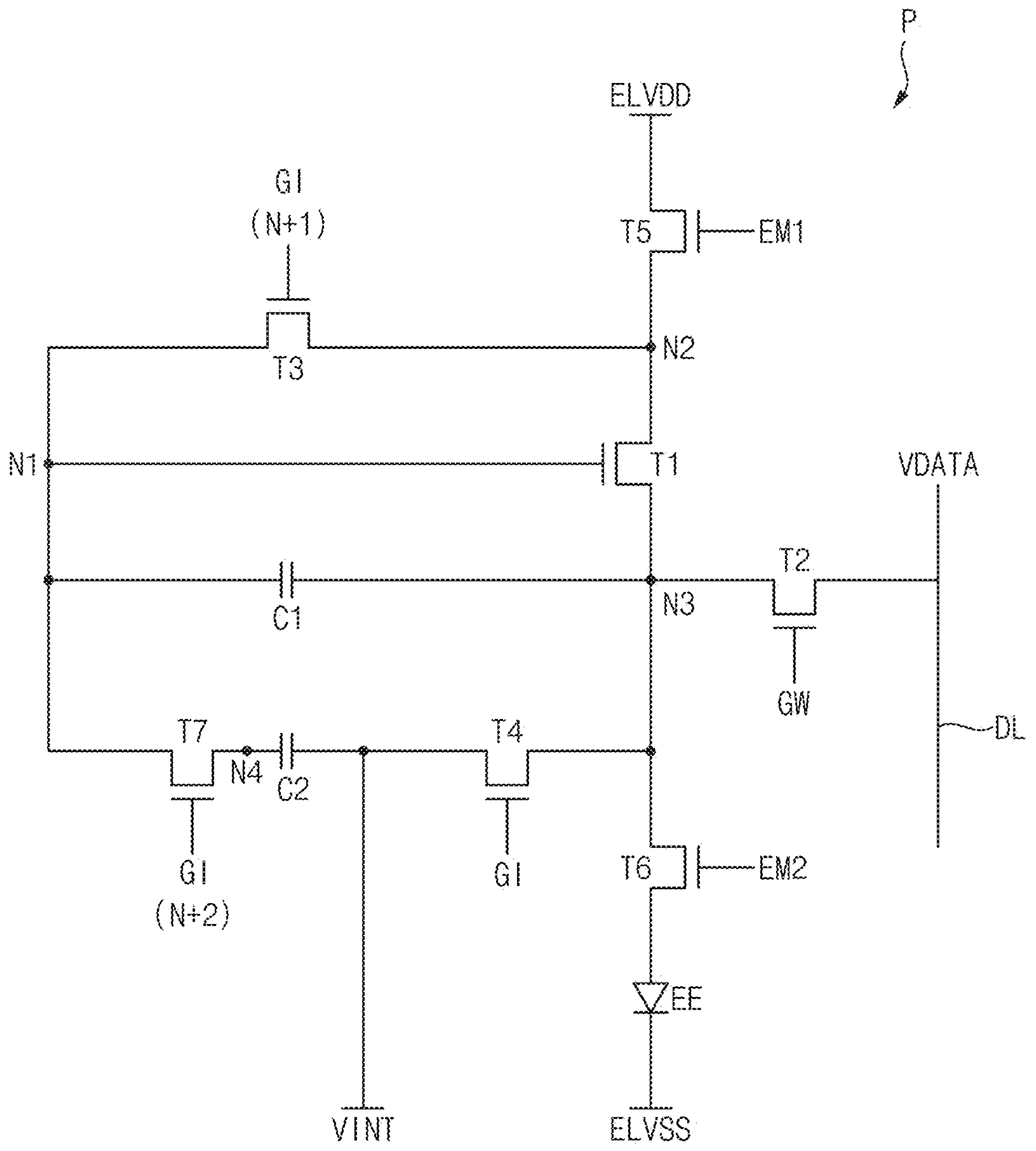
FIG. 2 is a circuit diagram showing an example of a pixel circuit of FIG. 1.

FIG. 2 is a circuit diagram showing an example of a pixel circuit of FIG. 1.

Referring to FIG. 2, a pixel circuit P may include a first transistor T1, a second transistor T2, a third transistor T3, a seventh transistor T7, a first capacitor C1, a second capacitor C2, and a light-emitting element EE.

The first transistor T1 may generate a driving current based on a voltage of a first node N1 and a voltage of a third node N3. In one or more embodiments, the first transistor T1 may include a control electrode connected to the first node N1, a first electrode connected to a second node N2, and a second electrode connected to the third node N3. For example, a threshold voltage of the first transistor T1 may be about 1.38 V.

The second transistor T2 may provide a data voltage VDATA to the third node N3 in response to a data write gate signal GW. In one or more embodiments, the second transistor T2 may include a control electrode for receiving the data write gate signal GW, a first electrode connected to a data line DL for providing the data voltage VDATA, and a second electrode connected to the third node N3.

The third transistor T3 may selectively connect the second node N2 and the first node N1 in response to an initialization gate signal GI(N+1) of the first next stage. In one or more embodiments, the third transistor T3 may include a control electrode for receiving the initialization gate signal GI(N+1) of the first next stage, a first electrode connected to the second node N2, and a second electrode connected to the first node N1.

The first capacitor C1 may store the data voltage VDATA. In one or more embodiments, the first capacitor C1 may include a first electrode connected to the third node N3 and a second electrode connected to the first node N1.

The seventh transistor T7 may selectively connect the first node N1 and a fourth node N4 in response to an initialization gate signal GI(N+2) of a second next stage. In one or more embodiments, the seventh transistor T7 may include a control electrode for receiving the initialization gate signal GI(N+2) of the second next stage, a first electrode connected to the first node N1, and a second electrode connected to the fourth node N4.

The second capacitor C2 may expand a data range of the data voltage VDATA. In one or more embodiments, the second capacitor C2 may include a first electrode connected to the fourth node N4, and a second electrode. In one or more embodiments, the second electrode of the second capacitor C2 may be connected to a line of an initialization voltage VINT. For example, the initialization voltage VINT may be about 0V.

The light-emitting element EE may emit a light based on the driving current. In one or more embodiments, the light-emitting element EE may include an anode electrode connected to the third node N3 and a cathode electrode connected to a line of a low power supply voltage ELVSS. For example, the low power supply voltage ELVSS may be about 0V.

The pixel circuit P may further include a fourth transistor T4. The fourth transistor T4 may provide the low power supply voltage ELVSS to the third node N3 in response to an initialization gate signal GI. In one or more embodiments, the fourth transistor T4 may include a control electrode for receiving the initialization gate signal GI, a first electrode connected to the third node N3, and a second electrode. In one or more embodiments, the second electrode of the fourth transistor T4 may be connected to the line of the initialization voltage VINT.

The third, fourth, and seventh transistors T3, T4, and T7 may use a same gate signal (e.g., the initialization gate signal GI, GI(N+1), GI(N+2)), such that a number of gate signals applied to the pixel circuit P may be reduced. Therefore, a dead space may be reduced.

The pixel circuit P may further include a fifth transistor T5 and a sixth transistor T6. The fifth transistor T5 may selectively connect a line of a high power supply voltage ELVDD and the second node N2 in response to a first emission signal EM1. In one or more embodiments, the fifth transistor T5 may include a control electrode for receiving the first emission signal EM1, a first electrode connected to the line of the high power supply voltage ELVDD, and a second electrode connected to the second node N2. For example, the high power supply voltage ELVDD may be about 12 V.

The sixth transistor T6 may selectively connect the third node N3 and the anode electrode in response to a second emission signal EM2. That is, the anode electrode may be connected to the third node N3 through the sixth transistor T6. In one or more embodiments, the sixth transistor T6 may include a control electrode for receiving the second emission signal EM2, a first electrode connected to the third node N3, and a second electrode connected to the anode electrode.

The fifth transistor T5 and the sixth transistor T6 may, together with the first transistor T1, form a path of the driving current from the line of the high power supply voltage ELVDD to the line of the low power supply voltage ELVSS.

In FIG. 2, the initialization gate signal GI may mean an initialization gate signal of a current stage, and an initialization gate signal GI(N+1) of a first next stage may mean an initialization gate signal generated in a first next stage of the current stage, and the initialization gate signal GI(N+2) of the second next stage may mean an initialization gate signal generated in a second next stage of the current stage. Therefore, the initialization gate signal GI may have a pulse generated before the initialization gate signal GI(N+1) of the first next stage and the initialization gate signal GI(N+2) of the second next stage, and the initialization gate signal GI(N+1) of the first next stage may have a pulse generated before the initialization gate signal GI(N+2) of the second next stage.

For example, because the initialization gate signal GI means the initialization gate signal of the current stage, GI may be equal to GI(N), and in the case of other gate signals GW, the other gate signals GW may mean a gate signal of the current stage, and in the case of emission signals EM1, EM2, the emission signals EM1, EM2 may mean emission signals of the current stage.

In one or more embodiments, the first to seventh transistors T1 to T7 may be N-type transistors. For example, when a signal applied to a control electrode of the N-type transistor has a high level, the N-type transistor may be turned on. For example, when the signal applied to the control electrode of the N-type transistor has a low level, the N-type transistor may be turned off.

Figure 3:
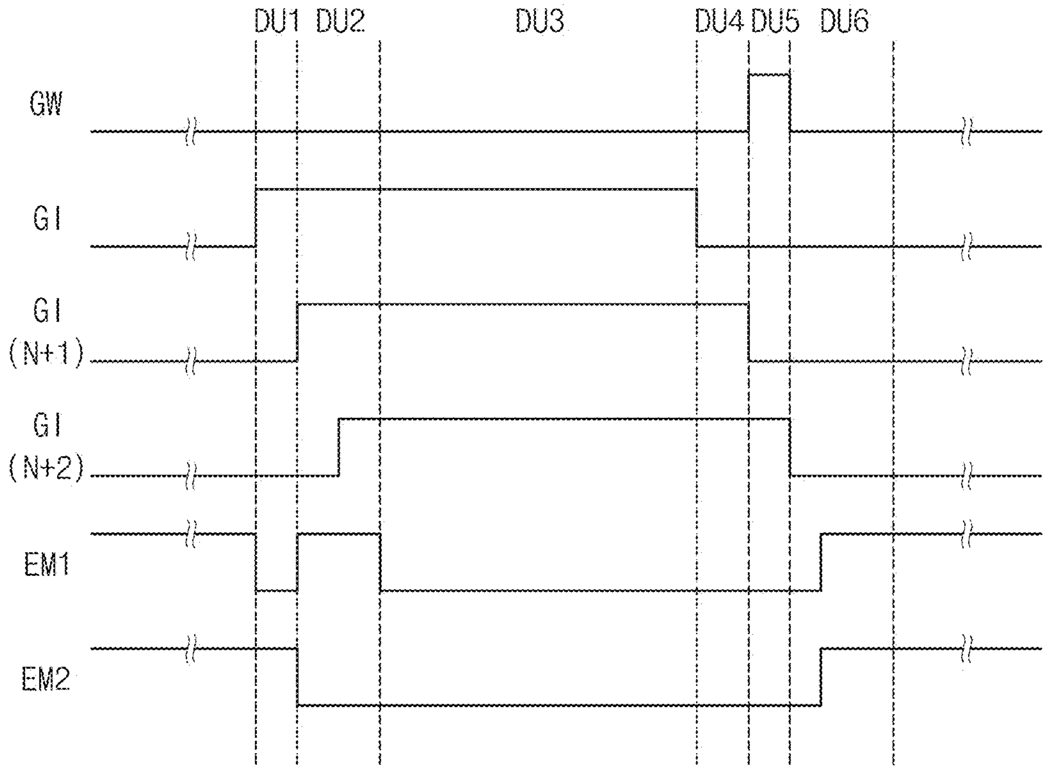
FIG. 3 is a timing diagram showing an example of an operation of a pixel circuit of FIG. 2.

FIG. 3 is a timing diagram showing an example of an operation of a pixel circuit of FIG. 2.

Referring to FIG. 2 and FIG. 3, each frame period for the pixel circuit P may include first to sixth durations DU1 to DU6. In the first to sixth durations DU1 to DU6, the data write gate signal GW, the initialization gate signal GI, the initialization gate signal GI(N+1) of the first next stage, the initialization gate signal GI(N+2) of the second next stage, the first emission signal EM1, and the second emission signal EM2 may have a high level and a low level. For example, the high level may be about 14 V, and the low level may be about −7 V.

In the first duration DU1, the initialization gate signal GI and the second emission signal EM2 may have the high level, and the data write gate signal GW, the initialization gate signal GI(N+1) of the first next stage, the initialization gate signal GI(N+2) of the second next stage, and the first emission signal EM1 may have the low level.

In the second duration DU2 following the first duration DU1, the initialization gate signal GI, the initialization gate signal GI(N+1) of the first next stage, and the first emission signal EM1 may have the high level, and the initialization gate signal GI(N+2) of the second next stage may have the low level and then the high level, and the data write gate signal GW and the second emission signal EM2 may have the low level.

In the third duration DU3 following the second duration DU2, the initialization gate signal GI, the initialization gate signal GI(N+1) of the first next stage, and the initialization gate signal GI(N+2) of the second next stage may have the high level, and the data write gate signal GW, the first emission signal EM1, and the second emission signal EM2 may have the low level.

In the fourth duration DU4 following the third duration DU3, the initialization gate signal GI(N+1) of the first next stage and the initialization gate signal GI(N+2) of the second next stage may have the high level, and the data write gate signal GW, the initialization gate signal GI, the first emission signal EM1, and the second emission signal EM2 may have the low level, and In the fifth duration DU5 following the fourth duration DU4, the data write gate signal GW and the initialization gate signal GI(N+2) of the second next stage may have the high level, and the initialization gate signal GI, the initialization gate signal GI(N+1) of the first next stage, the first emission signal EM1, and the second emission signal EM2 may have the low level.

In the sixth duration DU6 following the fifth duration DU5, the data write gate signal GW, the initialization gate signal GI, the initialization gate signal GI(N+1) of the first next stage, and the initialization gate signal GI(N+2) of the second next stage may have the low level, and the first emission signal EM1 and the second emission signal EM2 may have the high level and then the low level.

Figure 4:
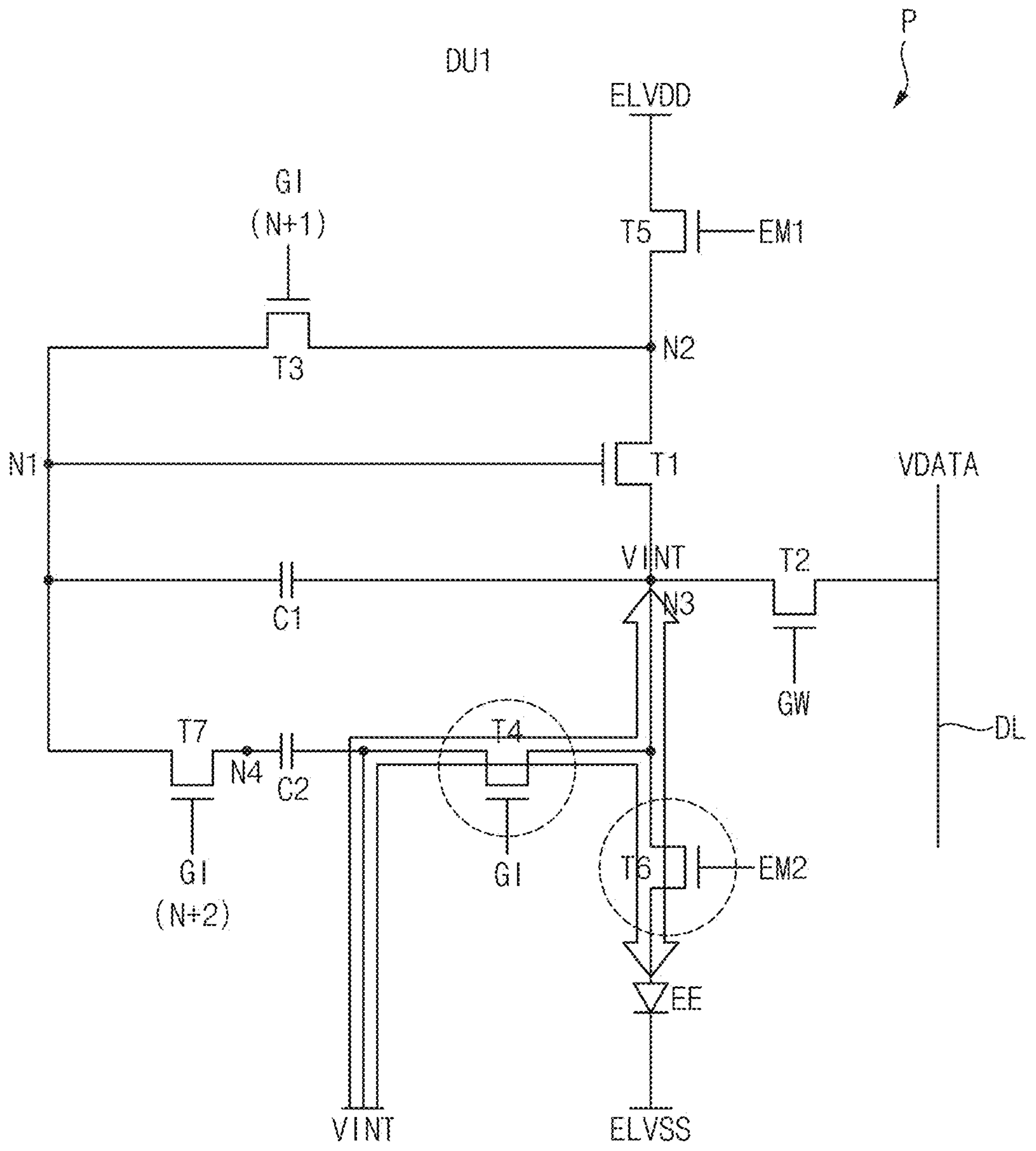
FIG. 4 is a circuit diagram showing an example of a pixel circuit of FIG. 2 operating in a first duration.

FIG. 4 is a circuit diagram showing an example of a pixel circuit of FIG. 2 operating in a first duration.

Referring to FIGS. 2 to 4, in the first duration DU1, the fourth transistor T4 may be turned on in response to the initialization gate signal GI having the high level to provide the initialization voltage VINT to the third node N3. The sixth transistor N6 may be turned on in response to the second emission signal EM2 having the high level to provide the voltage of the third node N3 to the anode electrode. Therefore, the third node N3 and the anode electrode may be initialized with the initialization voltage VINT.

Figure 5:
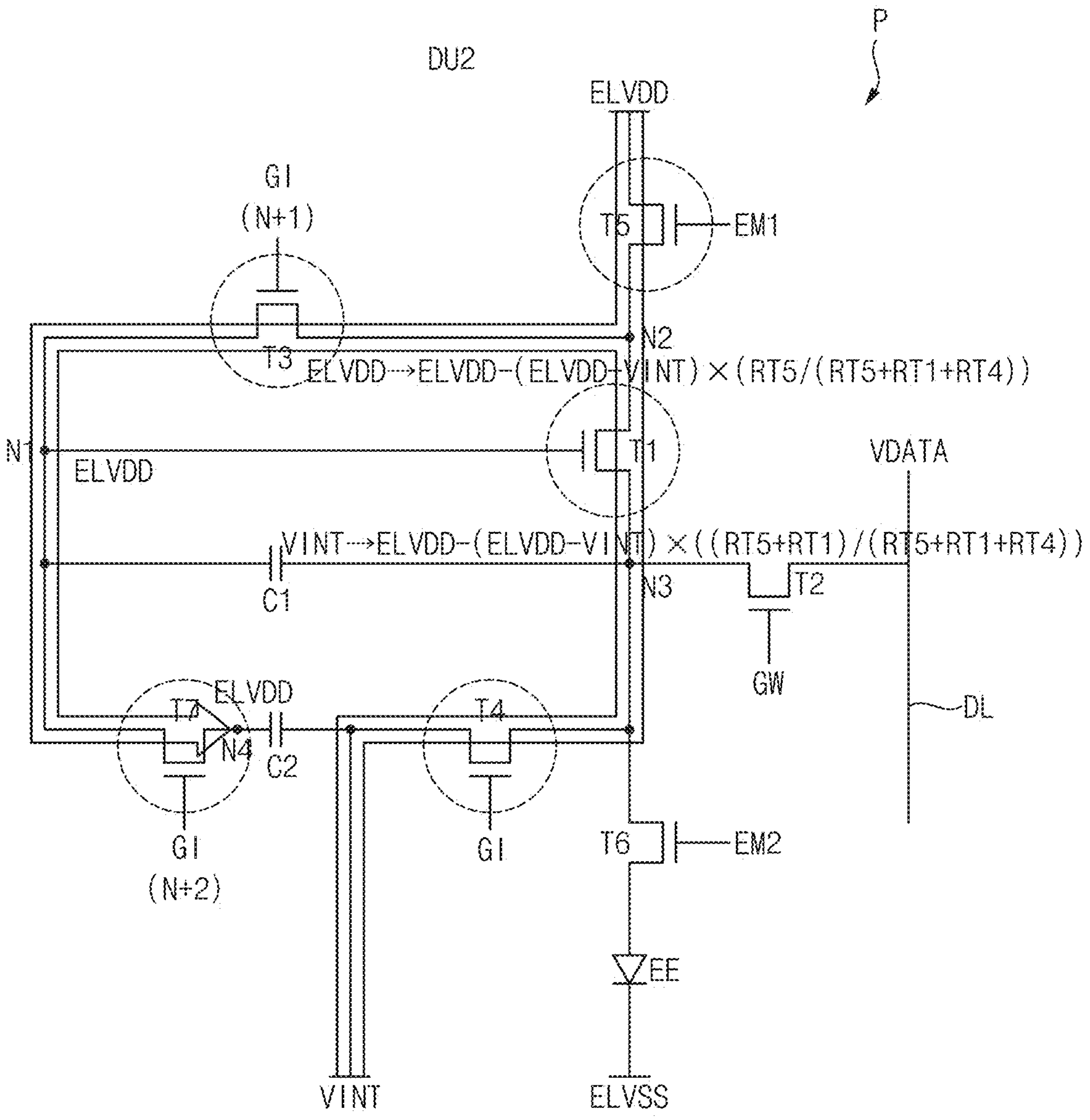
FIG. 5 is a circuit diagram showing an example of a pixel circuit of FIG. 2 operating in a second duration.

FIG. 5 is a circuit diagram showing an example of a pixel circuit of FIG. 2 operating in a second duration.

Referring to FIGS. 2 to 5, in the second duration DU2, the fourth transistor T4 may be turned on in response to the initialization gate signal GI having the high level, and the voltage of the third node N3 may be maintained at the initialization voltage VINT.

The sixth transistor T6 may be turned off in response to the second emission signal EM2 having the low level, such that the sixth transistor T6 may not provide the voltage of the third node N3 to the anode electrode.

The fifth transistor T5 may be turned on in response to the first emission signal EM1 having the high level to provide the high power supply voltage ELVDD to the second node N2. The third transistor T3 may be turned on in response to the initialization gate signal GI(N+1) of the first next stage having the high level to provide the voltage of the second node N2 to the first node N1. The seventh transistor T7 may be turned on in response to the initialization gate signal GI(N+2) of the second next stage having the high level to provide the voltage of the first node N1 to the fourth node N4. Therefore, the voltage of the second node N2, the voltage of the first node N1, and the voltage of the fourth node N4 may be the high power supply voltage ELVDD.

The first transistor T1 may be turned on in response to a gate-source voltage of the first transistor T1, and the gate-source voltage of the first transistor T1 may be a difference between the voltage of the first node N1 and the voltage of the third node N3.

The voltage of the first node N1 may be the high power supply voltage ELVDD, and the voltage of the third node N3 may be the initialization voltage VINT. Therefore, the gate-source voltage of the first transistor T1 may be "ELVDD-VINT" and may be greater than the threshold voltage of the first transistor T1, and the first transistor T1 may be turned on in response to the gate-source voltage of the first transistor T1.

Because the fifth transistor T5, the first transistor T1, and the fourth transistor T4 are in the turn-on state, a path may be formed between the line of the high power supply voltage ELVDD and the line of the initialization voltage VINT through the fifth transistor T5, the first transistor T1, and the fourth transistor T4.

For example, even if the fifth transistor T5, the first transistor T1, and the fourth transistor T4 are turned on, the fifth transistor T5, the first transistor T1, and the fourth transistor T4 may have an on-resistance. Therefore, the voltage of the second node N2 and the voltage of the third node N3 may be changed based on a voltage distribution of the on-resistance RT5 of the fifth transistor T5, the on-resistance RT1 of the first transistor T1, and the on-resistance RT4 of the fourth transistor T4. The voltage of the second node N2 may be changed from the high power supply voltage ELVDD to "ELVDD−(ELVDD−VINT)×(RT5/(RT5+RT1+RT4))", and the voltage of the third node N3 may be changed from the initialization voltage VINT to "ELVDD−(ELVDD−VINT)×((RT5+RT1)/(RT5+RT1+RT4))".

The voltage of the first node N1 may be the high power supply voltage ELVDD, and the voltage of the third node N3 may be "ELVDD−(ELVDD−VINT)×((RT5+RT1)/(RT5+RT1+RT4))". Therefore, the gate-source voltage of the first transistor T1 may be "(ELVDD−VINT)×((RT5+RT1)/(RT5+RT1+RT4))" and may be greater than the threshold voltage VTH of the first transistor T1, and the first transistor T1 may maintain the turn-on state in response to the gate-source voltage of the first transistor T1.

Figure 6:
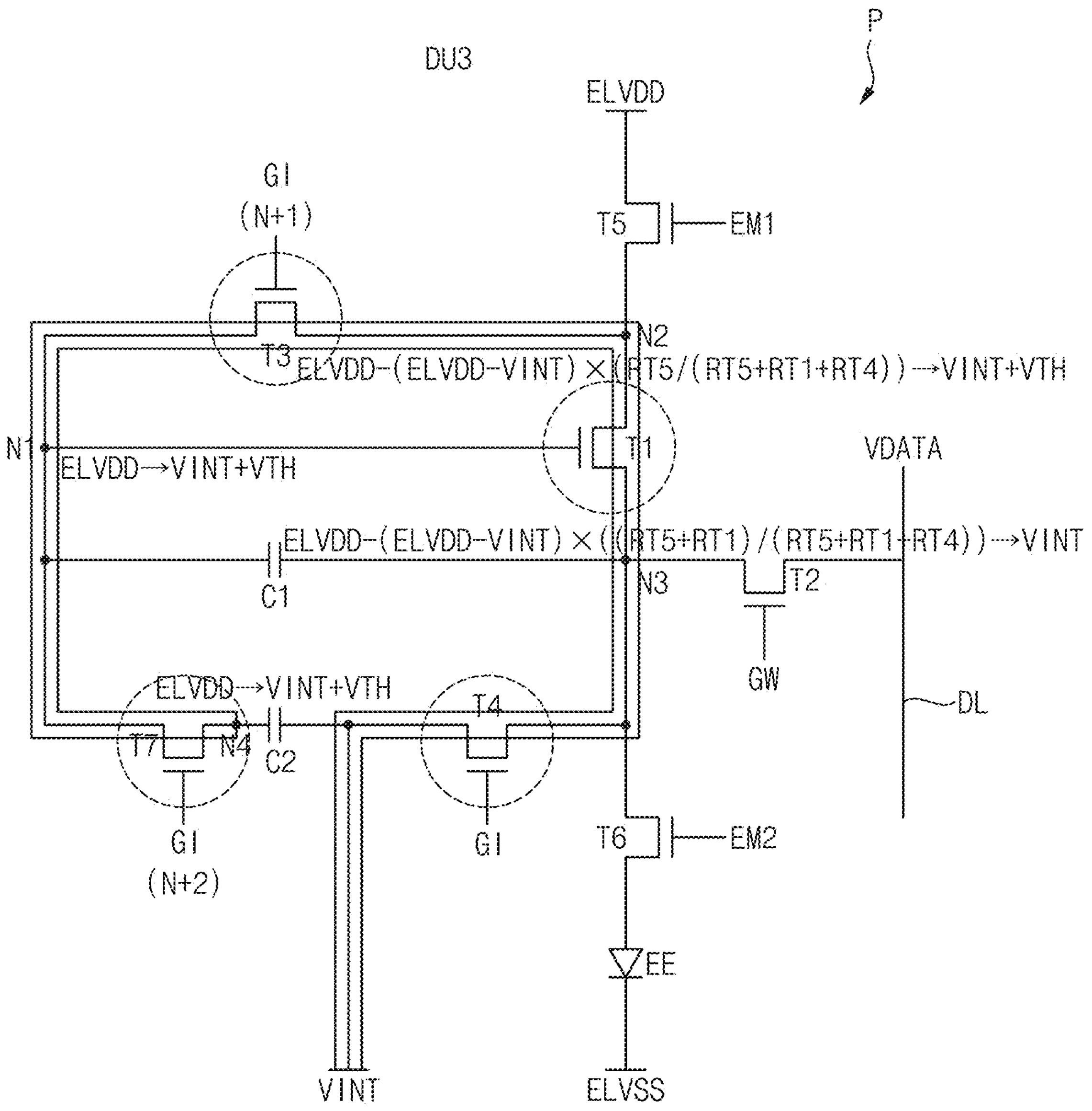
FIG. 6 is a circuit diagram showing an example of a pixel circuit of FIG. 2 operating in a third duration.

FIG. 6 is a circuit diagram showing an example of a pixel circuit of FIG. 2 operating in a third duration.

Referring to FIGS. 2 to 6, in the third duration DU3, the fourth transistor T4 may maintain the turn-on state in response to the initialization gate signal GI having the high level, the third transistor T3 may maintain the turn-on state in response to the initialization gate signal GI(N+1) of the first next stage having the high level, the seventh transistor T7 may maintain the turn-on state in response to the initialization gate signal GI(N+2) of the second next stage having the high level, and the first transistor T1 may maintain the turn-on state in response to the gate-source voltage of the first transistor T1.

The fifth transistor T5 may be turned off in response to the first emission signal EM1 having the low level, such that the fifth transistor T5 may not connect the line of the high power supply voltage ELVDD and the second node N2.

Because the fourth transistor T4 is turned on to provide the initialization voltage VINT to the third node N3 and the fifth transistor T5 is turned off, the voltage of the third node N3 may be changed from "ELVDD−(ELVDD−VINT)×((RT5+RT1)/(RT5+RT1+RT4))" to the initialization voltage VINT.

Because the voltage of the third node N3 is changed to the initialization voltage VINT and the fifth transistor T5 is turned off, the voltage of the second node N2, the voltage of the first node N1, and the voltage of the fourth node N4 may be changed from the high power supply voltage ELVDD to "VINT+VTH".

Because a voltage of the first electrode of the first capacitor C1 (e.g., the voltage of the third node N3) is the initialization voltage VINT and the voltage of the second electrode of the first capacitor C1 (e.g., the voltage of the first node N1) is "VINT+VTH," the first capacitor C1 may store the threshold voltage VTH of the first transistor T1 between the two electrodes. Accordingly, the threshold voltage VTH of the first transistor T1 may be compensated.

Similar to the first capacitor C1, the second capacitor C2 may also store the threshold voltage VTH of the first transistor T1 between the two electrodes.

The voltage of the first node N1 may be "VINT+VTH," and the voltage of the third node N3 may be "VINT." Therefore, the gate-source voltage of the first transistor T1 may be "VTH", and the first transistor T1 may maintain the turn-on state in response to the gate-source voltage of the first transistor T1.

Figure 7:
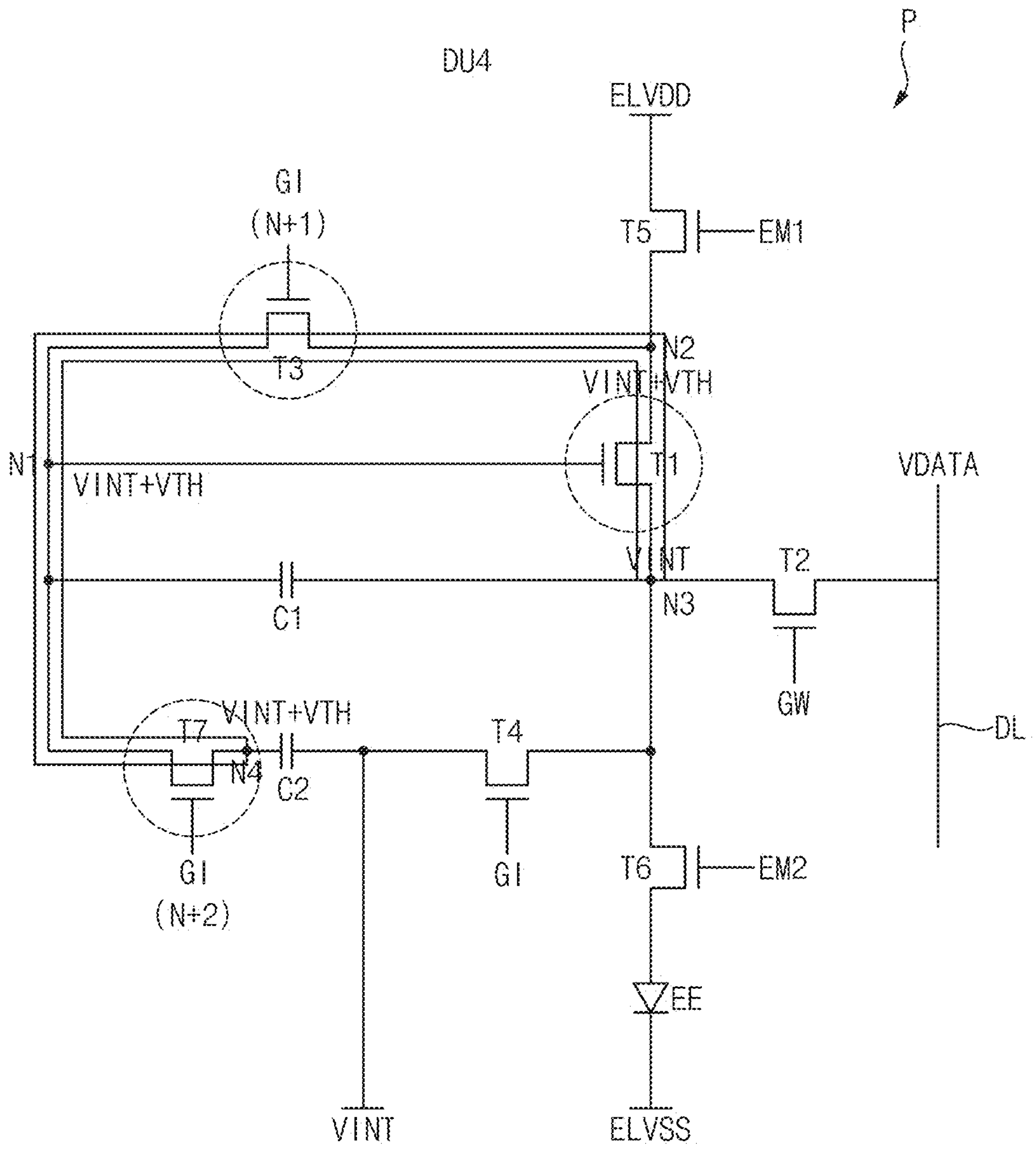
FIG. 7 is a circuit diagram showing an example of a pixel circuit of FIG. 2 operating in a fourth duration.

FIG. 7 is a circuit diagram showing an example of a pixel circuit of FIG. 2 operating in a fourth duration.

Referring to FIGS. 2 to 6, in the fourth duration DU4, the third transistor T3 may maintain the turn-on state in response to the initialization gate signal GI(N+1) of the first next stage having the high level, and the seventh transistor T7 may maintain the turn-on state in response to the initialization gate signal GI(N+2) of the second next stage having the high level.

The fourth transistor T4 may be turned off in response to the initialization gate signal GI having the low level, such that the fourth transistor T4 may not provide the initialization voltage VINT to the third node N3.

The voltage of the first node N1 may be "VINT+VTH", and the voltage of the third node N3 may be "VINT". Therefore, the gate-source voltage of the first transistor T1 may be "VTH", and the first transistor T1 may maintain the turn-on state in response to the gate-source voltage of the first transistor T1.

Figure 8:
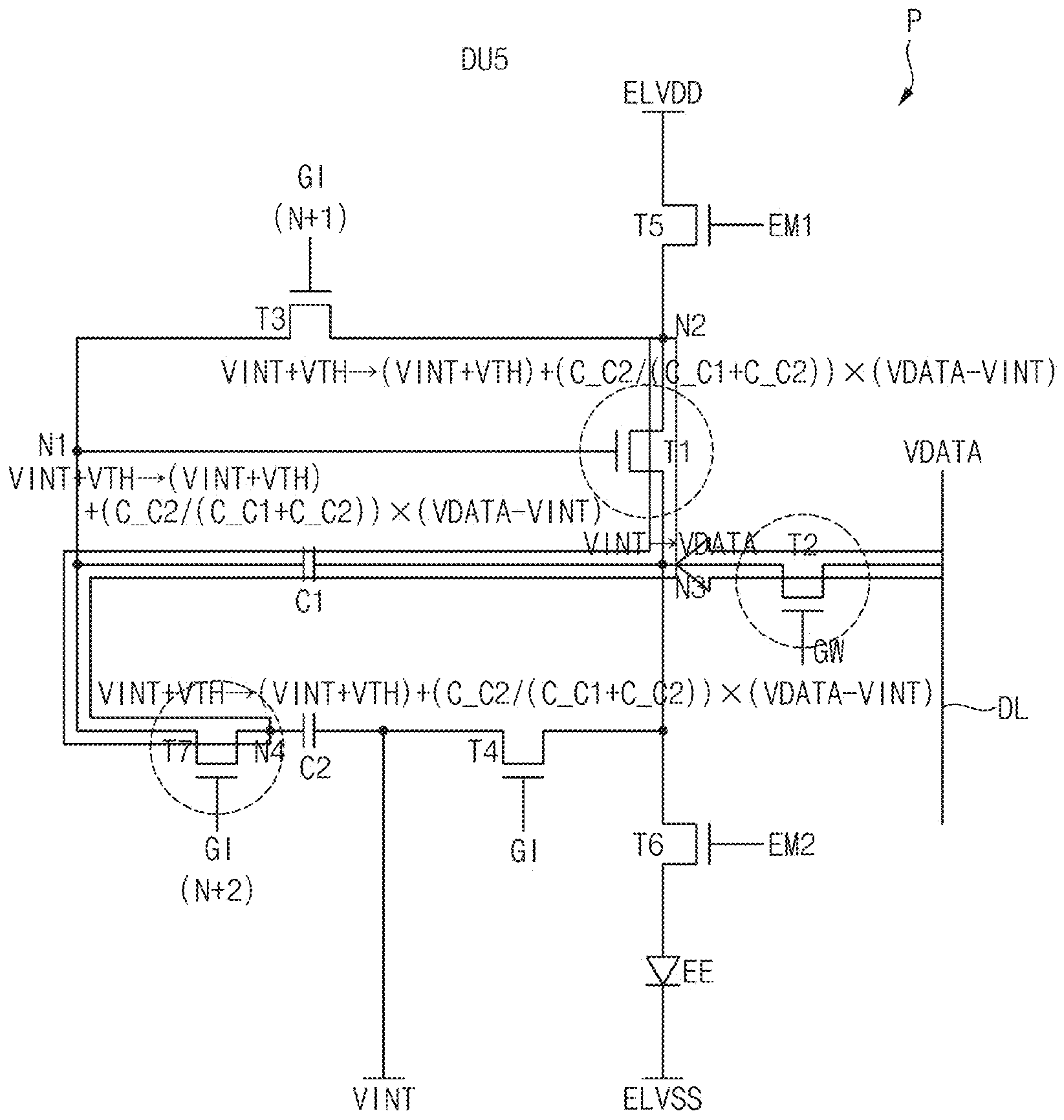
FIG. 8 is a circuit diagram showing an example of a pixel circuit of FIG. 2 operating in a fifth duration.

FIG. 8 is a circuit diagram showing an example of a pixel circuit of FIG. 2 operating in a fifth duration.

Referring to FIGS. 2 to 8, in the fifth duration DU5, the seventh transistor T7 may maintain the turn-on state in response to the initialization gate signal GI(N+2) of the second next stage having the high level, and the first transistor T1 may maintain the turn-on state in response to the gate-source voltage of the first transistor T1.

The third transistor T3 may be turned off in response to the initialization gate signal GI(N+1) of the first next stage having the low level, such that the third transistor T3 may not connect the second node N2 and the first node N1.

The second transistor T2 may be turned on in response to the data write gate signal GW having the high level to provide the data voltage VDATA to the third node N3. Therefore, the voltage of the third node N3 may be changed from the initialization voltage VINT to the data voltage VDATA by "VDATA-VINT."

When the voltage of the third node N3 is changed by "VDATA-VINT", the voltage of the first node N1 may be changed based on a voltage distribution of the first capacitor C1 and the second capacitor C2. The voltage of the first node N1 may be changed from "VINT+VTH" to "(VINT+VTH)+(C_C2/(C_C1+C_C2))×(VDATA−VINT)". Here, C_C1 may be a capacitance of the first capacitor C1, and C_C2 may be a capacitance of the second capacitor C2.

The voltage of the first node N1 may be "(VINT+VTH)+(C_C2/(C_C1+C_C2))×(VDATA−VINT)", and the voltage of the third node N3 may be the data voltage VDATA. Therefore, the gate-source voltage of the first transistor T1 may be "(VINT+VTH)+(C_C2/(C_C1+C_C2))×(VDATA−VINT)−VDATA". When the gate-source voltage of the first transistor T1 is classified into a component of VTH, a component of VDATA, and a component of ELVSS, the gate-source voltage of the first transistor T1 may be "VTH−(C_C1/(C_C1+C_C2))×VDATA+(C_C2/(C_C1+C_C2))×VINT".

The first transistor T1 may maintain the turn-on state in response to the gate-source voltage of the first transistor T1.

Figure 9:
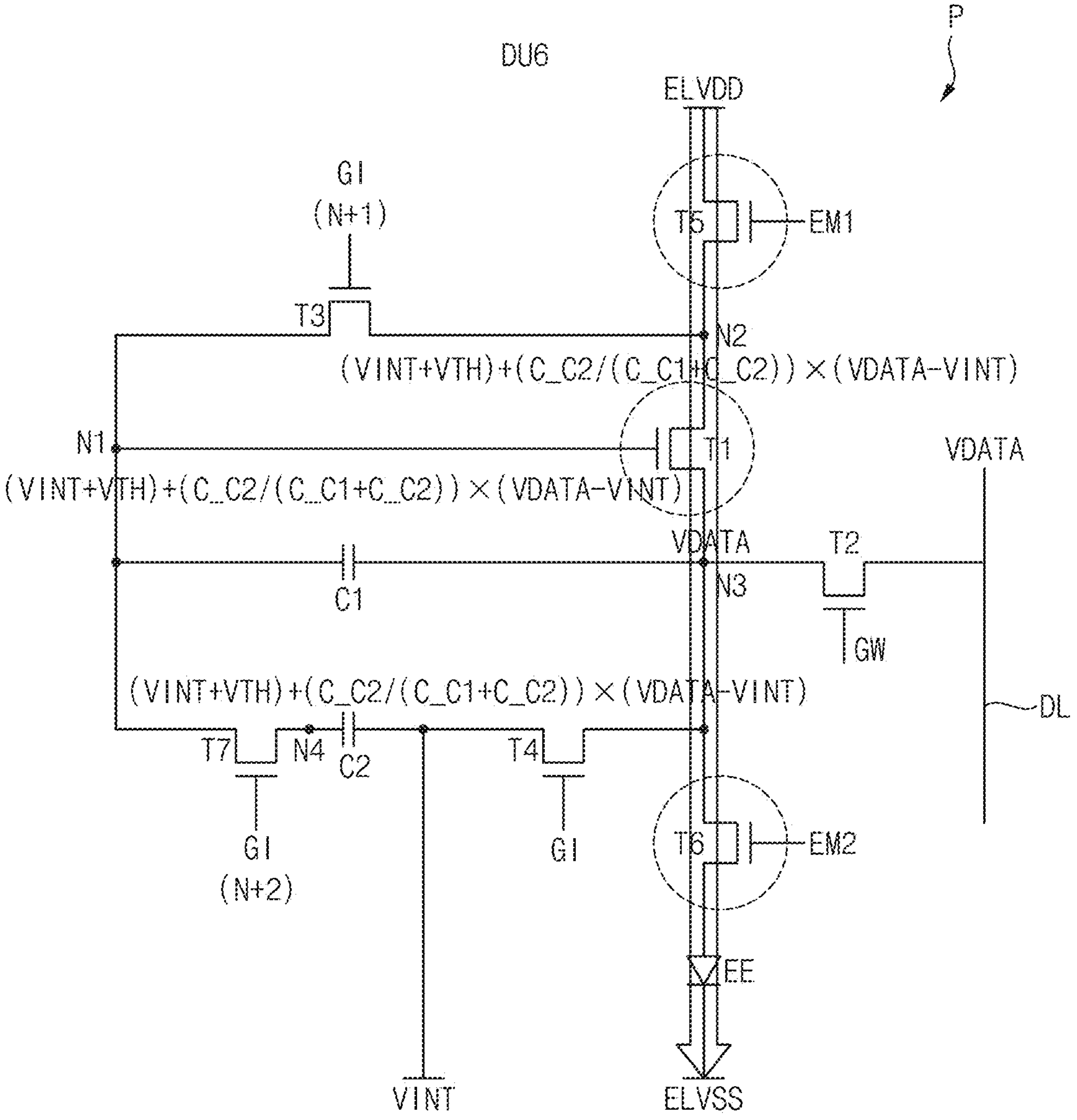
FIG. 9 is a circuit diagram showing an example of a pixel circuit of FIG. 2 operating in a sixth duration.

FIG. 9 is a circuit diagram showing an example of a pixel circuit of FIG. 2 operating in a sixth duration.

Referring to FIGS. 2 to 9, in the sixth duration DU6, the fifth transistor T5 may be turned on in response to the first emission signal EM1 having the high level, the first transistor T1 may maintain the turn-on state in response to the gate-source voltage of the first transistor T1, and the sixth transistor T6 may be turned on in response to the second emission signal EM2 having the high level.

The seventh transistor T7 may be turned off in response to the initialization gate signal GI(N+2) of the second next stage having the low level, such that the seventh transistor T7 may not connect the first node N1 and the fourth node N4.

The second transistor T2 may be turned off in response to the data write gate signal GW having the low level, such that the second transistor T2 may not provide the data voltage VDATA to the third node N3.

The voltage of the first node N1 may be "(VINT+VTH)+(C_C2/(C_C1+C_C2))×(VDATA−VINT)" and the voltage of the third node N3 may be the data voltage VDATA. Therefore, the gate-source voltage of the first transistor T1 may be "(VINT+VTH)+(C_C2/(C_C1+C_C2))×(VDATA−VINT)−VDATA". When the gate-source voltage of the first transistor T1 is classified into a component of VTH, a component of VDATA, and a component of ELVSS, the gate-source voltage of the first transistor T1 may be "VTH−(C_C1/(C_C1+C_C2))×VDATA+(C_C2/(C_C1+C_C2))×VINT".

Because the gate-source voltage of the first transistor T1 includes the threshold voltage VTH of the first transistor T1, and the driving current is determined based on a voltage obtained by subtracting the threshold voltage VTH of the first transistor T1 from the gate-source voltage of the first transistor T1, the driving current may be determined regardless of the threshold voltage VTH of the first transistor T1. In addition, because "C_C2/(C_C1+C_C2)" is less than 1, a data range of the data voltage VDATA may be expanded.

Because the fifth transistor T5, the first transistor T1, and the sixth transistor T6 are in the turn-on state, the path of the driving current between the line of the high power supply voltage ELVDD and the line of the low power supply voltage ELVSS may be formed, and the light-emitting element EE may emit a light based on the driving current.

For example, when the light-emitting element EE emits the light, the light-emitting element EE may deteriorate and the voltage of the anode electrode may fluctuate. Therefore, the voltage of the third node N3 may fluctuate. However, even if the voltage of the third node N3 fluctuates, because the first capacitor C1 maintains a voltage between the two electrodes, the first capacitor C1 may maintain the gate-source voltage of the first transistor T1. Therefore, even if the voltage of the anode electrode fluctuates as the light-emitting element EE emits the light, a change of the gate-source voltage of the first transistor T1 may be reduced or prevented, such that a change of the driving current may be reduced or prevented.

Figure 10:
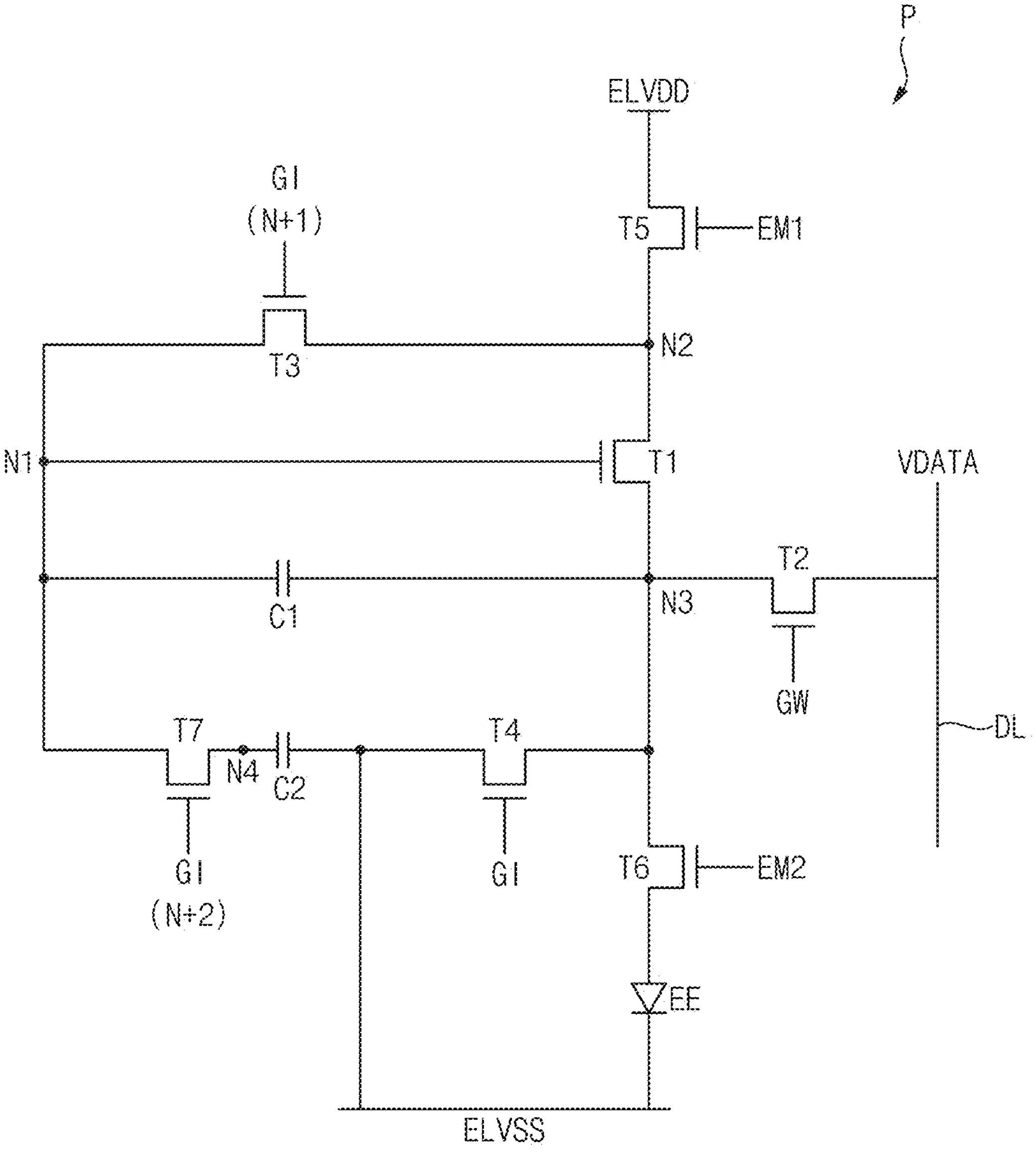
FIG. 10 is a circuit diagram showing an example of a pixel circuit of FIG. 1.

FIG. 10 is a circuit diagram showing an example of a pixel circuit of FIG. 1.

A pixel circuit of FIG. 10 may be substantially equal to the pixel circuit of FIG. 2 except for a connection relationship of the second electrode of the second capacitor C2 and the second electrode of the fourth transistor T4, and therefore a same reference numbers are used for identical or similar components, and redundant descriptions are omitted.

Referring to FIGS. 1 to 10, the second electrode of the second capacitor C2 and the second electrode of the fourth transistor T4 may be connected to the line of the low power supply voltage ELVSS.

Figure 11:
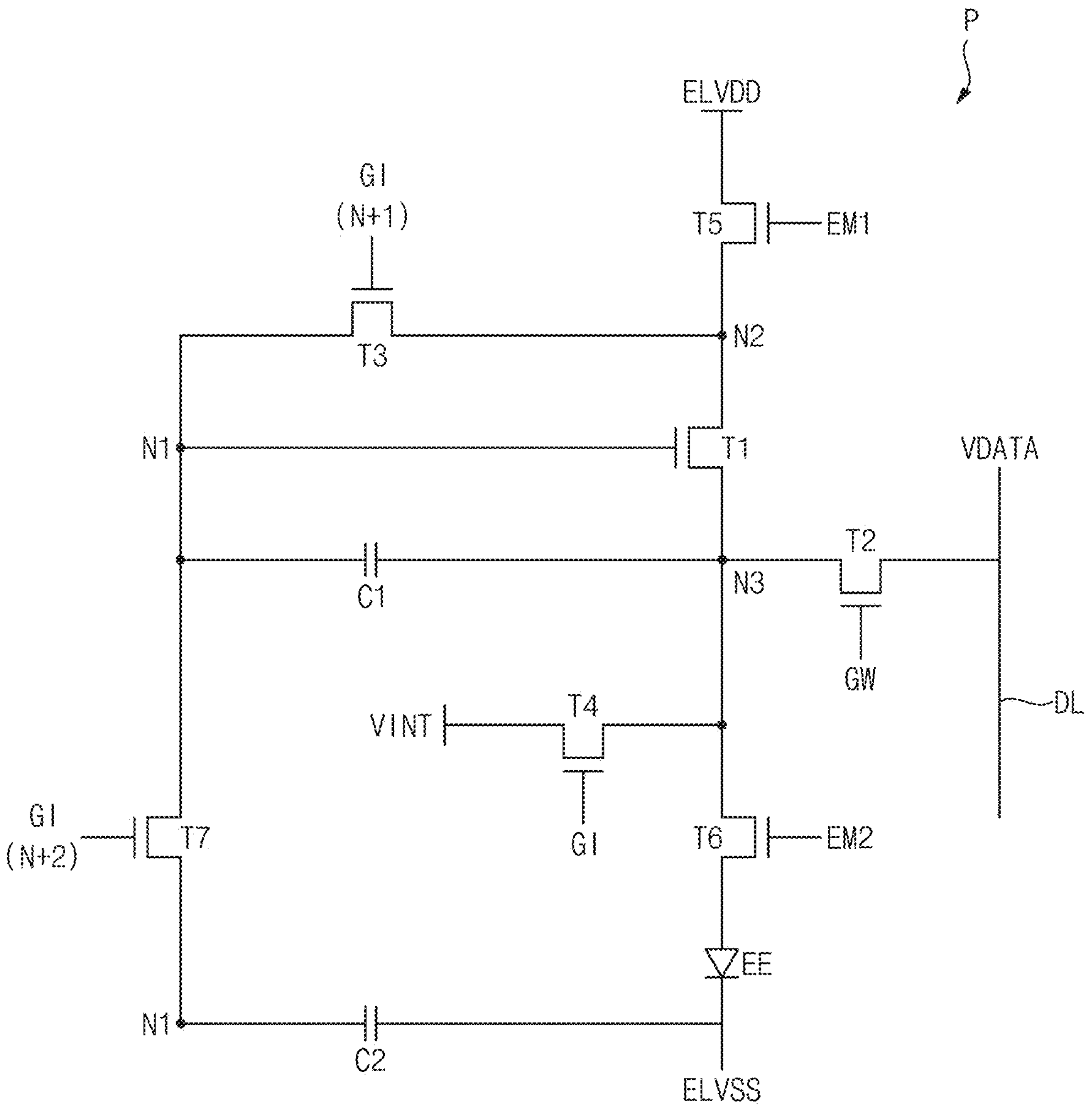
FIG. 11 is a circuit diagram showing an example of the pixel circuit of FIG. 1.

FIG. 11 is a circuit diagram showing an example of the pixel circuit of FIG. 1.

A pixel circuit of FIG. 11 may be substantially equal to the pixel circuit of FIG. 2 except for a connection relationship of the second electrode of the second capacitor C2, and therefore a same reference numbers are used for identical or similar components, and redundant descriptions are omitted.

Referring to FIGS. 1 to 8 and FIG. 11, the second electrode of the second capacitor C2 may be connected to the line of the low power supply voltage ELVSS, and the second electrode of the fourth transistor T4 may be connected to the line of the initialization voltage VINT.

Figure 12:
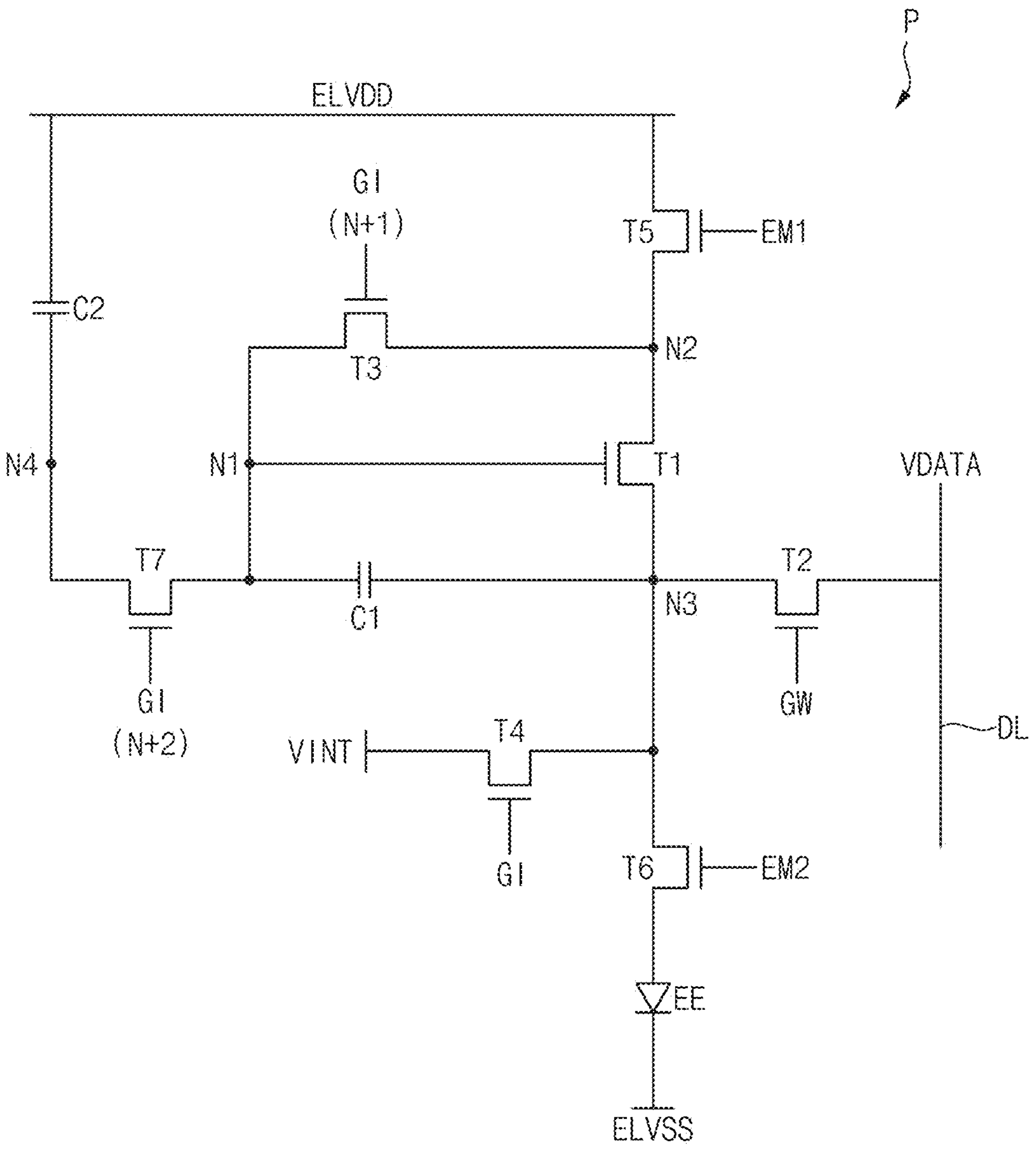
FIG. 12 is a circuit diagram showing an example of a pixel circuit of FIG. 1.

FIG. 12 is a circuit diagram showing an example of a pixel circuit of FIG. 1.

A pixel circuit of FIG. 12 may be substantially equal to the pixel circuit of FIG. 2 except for a connection relationship of the second electrode of the second capacitor C2, and therefore, a same reference numbers are used for identical or similar components, and redundant descriptions are omitted.

Referring to FIGS. 1 to 8 and FIG. 12, the second electrode of the second capacitor C2 may be connected to a line of a high power supply voltage ELVDD, and the second electrode of the fourth transistor T4 may be connected to a line of an initialization voltage VINT.

Figure 13:
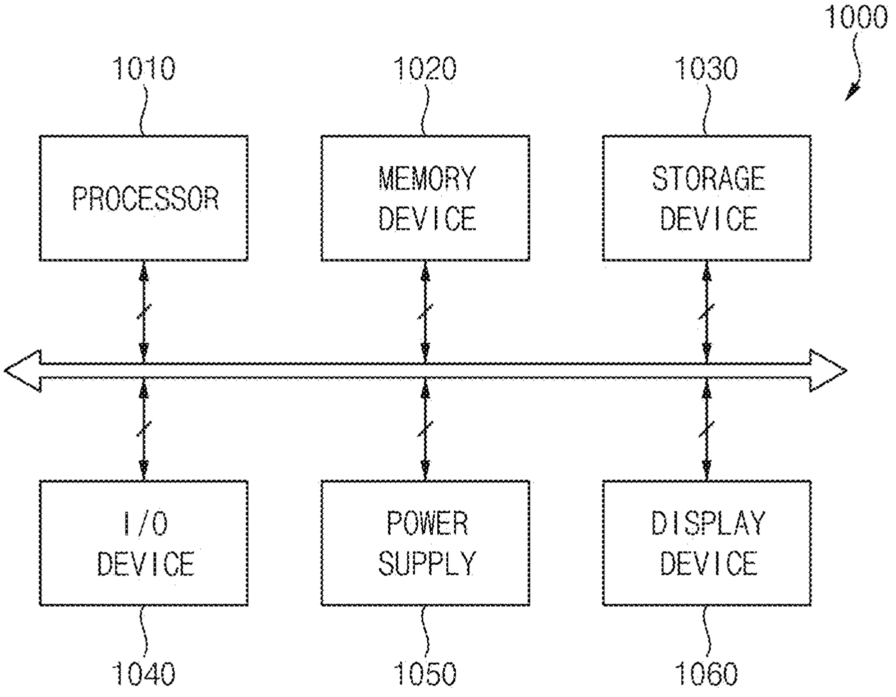
FIG. 13 is a block diagram showing an electronic device.
Figure 14:
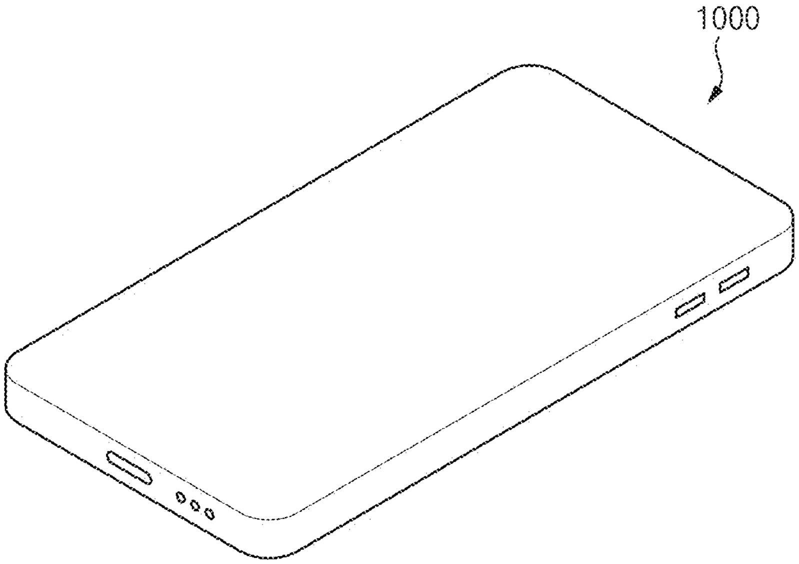
FIG. 14 is a diagram showing one or more embodiments in which an electronic device of FIG. 13 is implemented as a smart phone.

FIG. 13 is a block diagram showing an electronic device. FIG. 14 is a diagram showing one or more embodiments in which an electronic device of FIG. 13 is implemented as a smart phone.

Referring to FIGS. 13 and 14, an electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus USB device, other electronic device, and the like.

In one or more embodiments, as illustrated in FIG. 18, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a microprocessor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The present disclosure may be applied to any display device and any electronic device including the touch panel. For example, the present disclosure may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

The foregoing is illustrative of some embodiments and is not to be construed as limiting thereof. Although a few embodiments have been described, those skilled in the art will readily appreciate that many modifications are possible in the embodiments without materially departing from the novel teachings and aspects of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A pixel circuit, comprising:

a first transistor comprising a control electrode connected to a first node, a first electrode connected to a second node, and a second electrode connected to a third node;

a second transistor comprising a control electrode for receiving a data write gate signal, a first electrode connected to a data line for providing a data voltage, and a second electrode connected to the third node;

a third transistor comprising a control electrode for receiving an initialization gate signal of a first next stage, a first electrode connected to the second node, and a second electrode connected to the first node;

a first capacitor comprising a first electrode connected to the third node, and a second electrode connected to the first node;

a seventh transistor comprising a control electrode for receiving an initialization gate signal of a second next stage, a first electrode connected to the first node, and a second electrode connected to a fourth node;

a second capacitor comprising a first electrode connected to the fourth node, and a second electrode; and a light-emitting element comprising an anode electrode configured to receive a voltage of the third node, and a cathode electrode connected to a line of a low power supply voltage.

2. The pixel circuit of claim 1, further comprising a fourth transistor comprising a control electrode for receiving an initialization gate signal of a current stage, a first electrode connected to the third node, and a second electrode.

3. The pixel circuit of claim 2, wherein the second electrode of the second capacitor and the second electrode of the fourth transistor are connected to a line of an initialization voltage.

4. The pixel circuit of claim 2, wherein the second electrode of the second capacitor and the second electrode of the fourth transistor are connected to the line of the low power supply voltage.

5. The pixel circuit of claim 2, wherein the second electrode of the second capacitor is connected to the line of the low power supply voltage, and wherein the second electrode of the fourth transistor is connected to a line of an initialization voltage.

6. The pixel circuit of claim 2, wherein the second electrode of the second capacitor is connected to a line of a high power supply voltage, and wherein the second electrode of the fourth transistor is connected to a line of an initialization voltage.

7. The pixel circuit of claim 2, further comprising:

a fifth transistor configured to selectively connect a line of a high power supply voltage and the second node in response to a first emission signal; and a sixth transistor configured to selectively connect the third node and the anode electrode in response to a second emission signal.

8. The pixel circuit of claim 7, wherein the first to seventh transistors comprise N-type transistors.

9. The pixel circuit of claim 7, wherein, in a first duration:

the initialization gate signal and the second emission signal have a high level;

the data write gate signal, the initialization gate signal of the first next stage, the initialization gate signal of the second next stage, and the first emission signal have a low level;

the fourth transistor is turned on in response to the initialization gate signal having the high level to provide an initialization voltage to the third node; and the sixth transistor is turned on in response to the second emission signal having the high level to provide a voltage of the third node to the anode electrode.

10. The pixel circuit of claim 9, wherein, in a second duration following the first duration:

the initialization gate signal the initialization gate signal of the first next stage, and the first emission signal have the high level;

the initialization gate signal of the second next stage changes from the low level to the high level;

the data write gate signal and the second emission signal have the low level;

the fourth transistor is turned on in response to the initialization gate signal having the high level to provide the initialization voltage to the third node;

the sixth transistor is turned off in response to the second emission signal having the low level;

the fifth transistor is turned on in response to the first emission signal having the high level to provide the high power supply voltage to the second node;

the third transistor is turned on in response to the initialization gate signal of the first next stage having the high level to provide a voltage of the second node to the first node;

the seventh transistor is turned on in response to the initialization gate signal of the second next stage having the high level to provide a voltage of the first node to the fourth node;

the first transistor is turned on in response to the voltage of the first node and the voltage of the third node to connect the second node and the third node; and the fourth transistor is turned on in response to the initialization gate signal having the high level to connect the third node and the line of the initialization voltage.

11. The pixel circuit of claim 10, wherein, in a third duration following the second duration:

the initialization gate signal, the initialization gate signal of the first next stage, and the initialization gate signal of the second next stage have the high level;

the data write gate signal, the first emission signal, and the second emission signal have the low level; and the fifth transistor is turned off in response to the first emission signal having the low level.

12. The pixel circuit of claim 11, wherein, in a fourth duration following the third duration:

the initialization gate signal of the first next stage and the initialization gate signal of the second next stage have the high level;

the data write gate signal, the initialization gate signal, the first emission signal, and the second emission signal have the low level; and the fourth transistor is turned off in response to the initialization gate signal having the low level.

13. The pixel circuit of claim 12, wherein, in a fifth duration following the fourth duration:

the data write gate signal and the initialization gate signal of the second next stage have the high level;

the initialization gate signal, the initialization gate signal of the first next stage, the first emission signal, and the second emission signal have the low level;

the third transistor is turned off in response to the initialization gate signal of the first next stage having the low level; and the second transistor is turned on in response to the data write gate signal having the high level to provide the data voltage to the third node.

14. The pixel circuit of claim 13, wherein, in a sixth duration following the fifth duration:

the data write gate signal, the initialization gate signal, the initialization gate signal of the first next stage, and the initialization gate signal of the second next stage have the low level;

the first emission signal and the second emission signal change from the low level to the high level;

the seventh transistor is turned off in response to the initialization gate signal of the second next stage having the low level;

the second transistor is turned off in response to the data write gate signal having the low level;

the fifth transistor is turned on in response to the first emission signal having the high level; and the sixth transistor is turned on in response to the second emission signal having the high level.

15. A display device, comprising:

a display panel comprising a pixel circuit; and a display panel driver configured to drive the display panel, wherein the pixel circuit comprises:

a first transistor comprising a control electrode connected to a first node, a first electrode connected to a second node, and a second electrode connected to a third node;

a second transistor comprising a control electrode for receiving a data write gate signal, a first electrode connected to a data line for providing a data voltage, and a second electrode connected to the third node;

a third transistor comprising a control electrode for receiving an initialization gate signal of a first next stage, a first electrode connected to the second node, and a second electrode connected to the first node;

a first capacitor comprising a first electrode connected to the third node, and a second electrode connected to the first node;

a seventh transistor comprising a control electrode for receiving an initialization gate signal of a second next stage, a first electrode connected to the first node, and a second electrode connected to a fourth node;

a second capacitor comprising a first electrode connected to the fourth node, and a second electrode; and a light-emitting element comprising an anode electrode configured to receive a voltage of the third node, and a cathode electrode connected to a line of a low power supply voltage.

16. The display device of claim 15, wherein the pixel circuit further comprises a fourth transistor comprising a control electrode for receiving an initialization gate signal of a current stage, a first electrode connected to the third node, and a second electrode.

17. The display device of claim 16, wherein the second electrode of the second capacitor and the second electrode of the fourth transistor are connected to a line of an initialization voltage.

18. The display device of claim 16, wherein the second electrode of the second capacitor and the second electrode of the fourth transistor are connected to the line of the low power supply voltage.

19. The display device of claim 16, wherein the second electrode of the second capacitor is connected to the line of the low power supply voltage, and wherein the second electrode of the fourth transistor is connected to a line of an initialization voltage.

20. An electronic device, comprising:

a display panel comprising a pixel circuit; and a display panel driver configured to drive the display panel; and a processor configured to control the display panel driver, wherein the pixel circuit comprises:

a first transistor comprising a control electrode connected to a first node, a first electrode connected to a second node, and a second electrode connected to a third node;

a second transistor comprising a control electrode for receiving a data write gate signal, a first electrode connected to a data line for providing a data voltage, and a second electrode connected to the third node;

a third transistor comprising a control electrode for receiving an initialization gate signal of a first next stage, a first electrode connected to the second node, and a second electrode connected to the first node;

a first capacitor comprising a first electrode connected to the third node, and a second electrode connected to the first node;

a seventh transistor comprising a control electrode for receiving an initialization gate signal of a second next stage, a first electrode connected to the first node, and a second electrode connected to a fourth node;

a second capacitor comprising a first electrode connected to the fourth node, and a second electrode; and a light-emitting element comprising an anode electrode configured to receive a voltage of the third node, and a cathode electrode connected to a line of a low power supply voltage.

* * * * *